United States Patent [19]

Genelin

[11] Patent Number: 4,601,261
[45] Date of Patent: Jul. 22, 1986

[54] APPARATUS FOR ELICITING RESPONSES BY ANIMALS TO MOVING, VISUALLY DISCERNIBLE STIMULI

[76] Inventor: Gregory U. Genelin, 14788 Sky View Rd., Madera, Calif. 93638

[21] Appl. No.: 693,667

[22] Filed: Jan. 22, 1985

[51] Int. Cl.[4] ............................................. A01K 15/02
[52] U.S. Cl. ..................................................... 119/29
[58] Field of Search .................. 119/29; 273/359, 369

[56] References Cited

U.S. PATENT DOCUMENTS

| | | | |
|---|---|---|---|
| 3,303,821 | 2/1967 | Harris | 119/29 |
| 3,324,832 | 6/1967 | McCain | 119/29 |
| 3,471,153 | 10/1969 | Baumler | 273/359 |

Primary Examiner—Hugh R. Chamblee
Attorney, Agent, or Firm—Edward J. Pavsek, Jr.

[57] ABSTRACT

A device for providing a stimulus visually discernible by an animal such as a horse, providing a driving assembly; a target borne in an elevated attitude having a predetermined head portion and an opposite tail portion; a track portion defining a path of travel along which the target is adapted to travel; a portion adapted to be moved by the driving assembly and connected to the target to move the target along the path of travel; and means for orienting the head portion of the target in the direction of movement thereof.

14 Claims, 9 Drawing Figures

APPARATUS FOR ELICITING RESPONSES BY ANIMALS TO MOVING, VISUALLY DISCERNIBLE STIMULI

BACKGROUND OF THE INVENTION

1. Field of the Invention

The present invention relates to the invention of my co-pending U.S. Pat. application, Ser. No. 548,621, filed Nov. 4, 1983. As such, the present invention relates to an apparatus for eliciting responses from an animal to the movement and cessation of movement of a visual stimulus, and more particularly to such an apparatus which finds utility in the training of horses to respond to unpredictable movements of cows and other animals.

2. Description of the Prior Art

The use of various devices, apparatuses and methods for training animals to respond to visual stimuli, and more particularly for the training of "cutting" horses to respond to the movements of cows and other animals, has been known heretofore. Some of the devices previously employed have incorporated into their structures simulated animals capable of being moved by operation of the device.

While many known devices have some degree of utility and effectiveness in the training of animals, such as cutting horses, they are invariably either expensive, subject to damage when used in typical operational environments, or produce movement of the simulated animals which does not resemble that of the live animal that the artificial animal is intended to represent.

Therefore, it has long been known that it would be desirable to have a device adapted to elicit responses by an animal to moving, visual stimuli, and more particularly to such a device which finds particular utility in the training of cutting horses to respond to the often unpredictable movements of cows and other animals. Further, it has long been known that it would be desirable to have such a device which provides a moving, visual stimulus adapted to closely imitate the movements of a cow or the like, and whose operation is capable of being controlled by a human rider astride a horse to be trained.

OBJECTS AND SUMMARY OF THE INVENTION

Therefore, it is an object of the present invention to provide an improved training device for use in training animals to respond to the unpredictable movements of objects.

Another object is to provide such a device which has particular utility in the training of cutting horses to respond to the movements of cows and the like.

Another object is to provide such a device which is capable of simulating the movements of a single animal, such as a cow.

Another object is to provide such a device which is adapted for rigid and relatively effortless assembly and disassembly.

Another object is to provide such a device which can be deployed in a wide variety of operative environments.

Another object is to provide such a device which can be constructed economically and sold for a nominal price.

Another object is to provide such a device which has utility in the training of different animals of varying levels of skill.

Further objects and advantages are to provide improved elements and arrangements thereof in a device for the purposes described which is dependable, economical, durable and fully effective in accomplishing its intended purposes.

DESCRIPTION OF THE PREFERRED EMBODIMENT

Figures 1, 2:
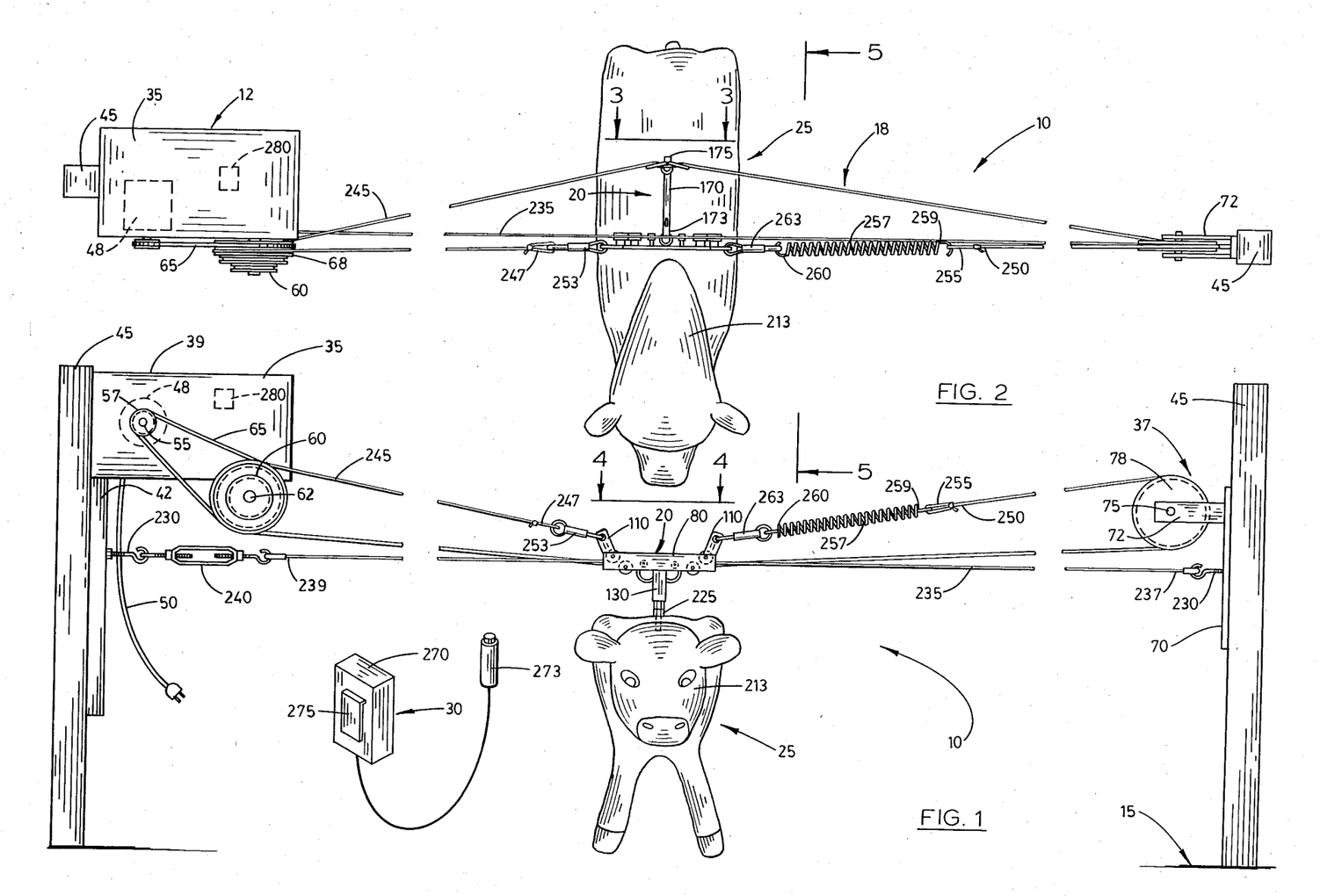
FIG. 1 is a front elevation of the device of the present invention, shown operatively deployed, with a control portion thereof enlarged for illustrative purposes.
FIG. 2 is a top plan view of the device of FIG. 1.

Referring more particularly to the drawings, the device embodying the principles of the present invention is designated generally by the numeral 10 in FIGS. 1 and 2. As shown therein, the device 10 generally provides a driving assembly 12 adapted to be mounted in an elevated attitude relative to an earth or other surface 15. The device further provides a carrier assembly 18 removably mounted by the driving assembly 12. A target mount member 20 is borne by a portion of the carrier assembly 18 for movement therewith upon operation of the driving assembly 12, as is described in greater detail hereafter. A target 25 simulative of an animal is removably secured to the target mount 20 and is carried by the target mount 20 upon movement thereof. Driving assembly control means 30 are provided for enabling remote control of the device 10 by an operator thereof.

The driving assembly 12 generally provides a motive portion 35 and a separate, driven portion 37. The motive portion 35 has a housing 39 mounting an elongated, substantially flat mounting plate 42. The mounting plate 42 is adapted to be secured on a substantialy upright support structure 45, such as a fence post or the like, located in a chosen operative environment, or provided specially for the purpose of mounting the motive portion. The mounting plate 42 can be secured to the support structure 45 by any suitable means, such as nails, bolts or the like, to deploy the motive portion 35 in an elevated attitude a predetermined height above the ground or other surface 15.

Drive means 48 are mounted within the housing 39 and can be of any suitable design and construction; in the preferred embodiment, the drive means 48 include a conventional reversible electric motor of any desired or suitable horsepower and adapted to be connected to a source of electrical energy by an electrical cord 50, although it is understood that other suitable drive means can be provided.

Extending transversely from the housing 39 is a drive axle 55 adapted to be rotated about a substantially horizontal axis of rotation when the motive portion 35 is deployed in an operative attitude and the drive means 48 are operated. The drive axle 55 mounts a drive pulley 57 for rotation with the drive axle upon operation of the drive means 48. A secondary drive pulley assembly 60 is borne on an axle 62 mounted subjacently of the housing 39 and is connected in driven relation to the drive pulley 57 by an endless belt 65 for rotation of the axle 62 about an axis of rotation substantially parallel to that of the drive axle 55 upon rotation of the drive axle 55 by the drive means 48. A plurality of secondary pulleys 68 are carried on the axle 62 for rotation therewith. The secondary pulleys 68 are of differing diameters to enable movement of the carrier assembly 18 by the driving assembly 12 at differing selected speeds, as is described in greater detail hereafter.

The driven portion 37 of the driving assembly 12 provides a mounting plate 70 mounting a bracket 72. The bracket 72 mounts a transverse axle 75 on which a driven pulley 78 is borne for rotation with the axle 75 about an axis of rotation. The driven portion 37 is adapted to be mounted in an elevated attitude relative to the ground surface 15 on a support structure 45 of a construction substantially similar to that of the support structure 45 mounting the motive portion 35. Preferably, in an operative attitude, the driven portion 37 is mounted to dispose the axle 75 at an elevation above the ground surface 15 substantially equivalent to that by which the axle 62 is elevated and to permit rotation of the axle 75 about an axis of rotation substantially parallel to that of the axis of rotation of the axle 62.

The target mount 20 is illustrated in greater detail in FIGS. 3, 4, 6, 7 and 8. As shown therein, the target mount provides an elongated, substantially flat frame 80 constructed of metal or other suitable, substantially rigid material. The frame 80 has a predetermined first or front surface 82 and an opposite, second or rear surface 84. The frame further provides a predetermined upper edge portion 86 and an opposite, lower edge portion 88.

A first pair of guide wheels 90 are individually mounted in spaced relation in proximity to the opposite ends of the frame 80 near its upper edge portion 86. A second pair of guide wheels 92 are mounted in spaced relation on the frame in proximity to its lower edge portion 88. As can best be seen by reference to FIG. 3, the distance by which the wheels 92 of the second pair are separated is less than that by which the wheels 90 are separated. The guide wheels 90 and 92 are mounted for rotation about substantially parallel axes of rotation, the axes of rotation being disposed substantially perpendicularly to the front surface 82 of the frame 80. As can best be seen by reference to FIGS. 7 and 8, each of the wheels 90 and 92 provide a circumferential recessed channel 93 thereabout, the channel of each having a predetermined diameter. Preferably, although not necessarily, all four of the wheels are of substantially identical dimensions, and the channels 93 thereof are of substantially equivalent diameters.

Figure 7:
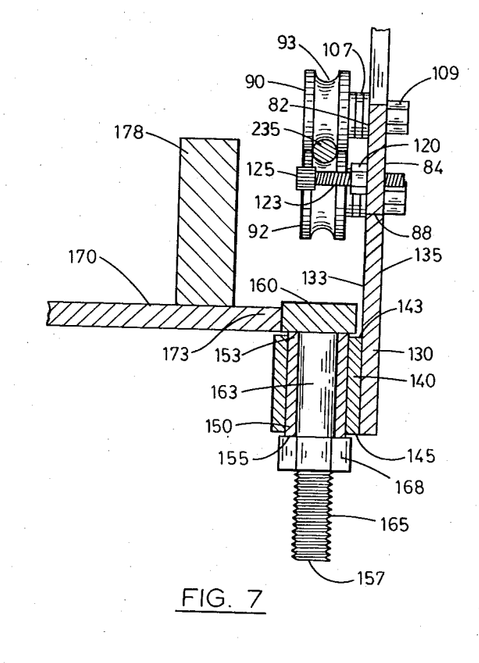
FIG. 7 is a transverse sectional view taken on line 7—7 in FIG. 4.
Figure 8:
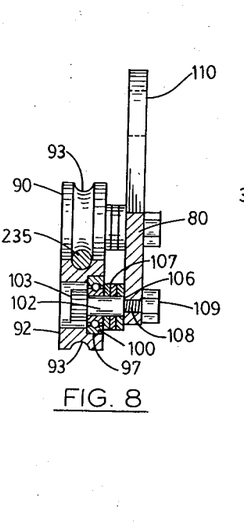
FIG. 8 is a transverse section taken on line 8—8 in FIG. 4.

As can best be seen in FIG. 8, the wheels 90 and 92 each provide a recessed seat portion 97 having an annular bushing 100 tightly seated therein. A shoulder bolt 102 having a head 103 and shoulder 106 is received through the bushing 100 of each wheel for rotation of the wheel about the bolt. Each bolt 102 is disposed substantially normally in relation to the frame 80. A plurality of annular spacers 107 are received about the shoulder 106 of each bolt and serve to space each wheel 90 or 92 from the front surface 82 of the frame 80 a predetermined distance. Each bolt provides a screw-threaded distal end 108 remote from the head 103 and screw-threadably received through the frame 80 to secure the bolt thereto. A nut 109 is secured on the endmost portion of the screw-threaded distal end portion 108 of each bolt 102. As can best be seen by reference to FIG. 8, the wheels 90 and 92 are spaced a substantially equivalent distance from the front surface 82 of the frame 80 to align the channels 93 thereof in a substantially common plane. As can also be seen by reference to FIGS. 7 and 8, the wheels 90 and 92 are spaced from each other a predetermined distance relative to the upper edge portion 86 and lower edge portion 88 of the frame to permit the passage of a portion of the carrier assembly 18 therebetween, as is described in greater detail below.

Figure 3:
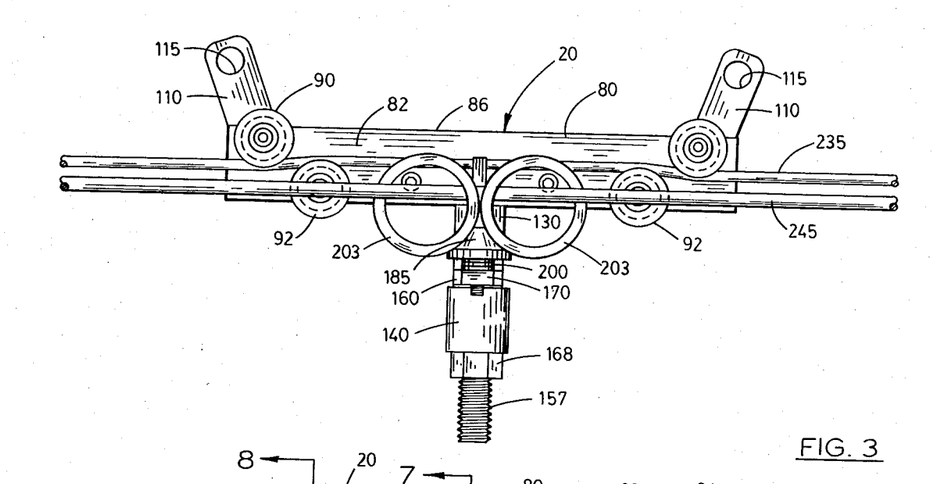
FIG. 3 is a somewhat enlarged rear elevational view taken generally along line 3—3 in FIG. 2, showing a portion of the device of FIG. 1 with a target portion removed.

As can best be seen in FIG. 3, the frame 80 rigidly mounts a pair of upwardly extending ears 110 on its upper edge portion 86. The ears 110 are spaced remotely from each other on opposite ends of the frame and are upwardly divergent from each other. Each ear provides a hole 115 of predetermined dimensions communicating transversely therethrough.

Figure 4:
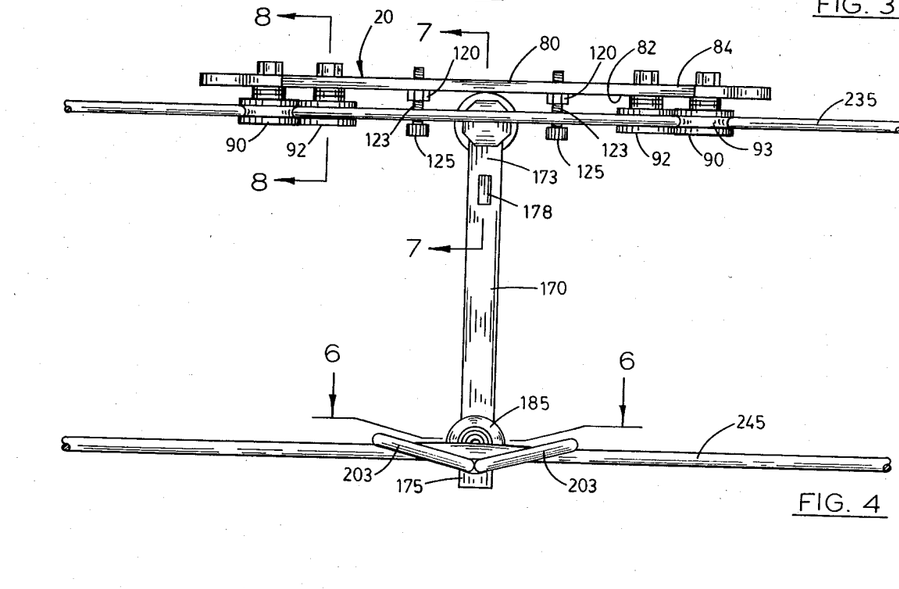
FIG. 4 is a top plan view of the portion of the device shown in FIG. 3.

As best shown in FIGS. 4 and 7, a pair of nuts 120 are secured as by welding or the like on the front surface 82 of the frame 80 in longitudinally spaced relation to each other. A pair of bolts 123 are individually screw-threadably received in the nuts and each bolt 123 provides a head 125. The bolts are screw-threadably adjustable to move the heads 125 toward and away from the front surface 82 of the frame 80. The nuts 120 are spaced from each other longitudinally substantially equidistantly about the midpoint of the frame 80.

The frame 80 further provides an elongated post 130 extending in the plane of the frame downwardly from the lower edge portion 88 substantially equidistantly between the opposite end portions of the frame. The post is substantially flat and provides a predetermined front surface 133 and an opposite rear surface 135 corresponding respectively to the front surface 82 and rear surface 84 of the frame.

As can best be seen in FIG. 7, a cylindrical sleeve 140 having an upper end portion 143 and an opposite lower end portion 145 is secured as by welding or the like on the front surface 133 of the post 130 distally of the lower edge portion 88 of the frame 80. The sleeve is substantially symmetrical about a longitudinal axis. A substantially cylindrical bearing 150 is closely received within the sleeve 140 and is disposed in substantially coaxial relation thereto. The bearing 150 provides an upper end portion 153 and an opposite lower end portion 155 extending, respectively, slightly from the upper end 143 and lower end 145 of the sleeve. A bolt 157 extends through the bearing 150 and provides a polygonal head portion 160 borne on a shaft 163 having a screw-threaded distal end portion 165. The bolt is of predetermined dimensions and is closely received within the bearing for rotation of the bolt therein about an axis of rotation substantially coextensive with the longitudinal axis of the sleeve. A nut 168 is screw-threadably received on the screw-threaded distal end portion 165 of the bolt.

An elongated, substantially flat arm 170 having a proximal end portion 173 and an opposite, distal end portion 175 is secured at its proximal end portion on the head 160 of the bolt 157, as by welding or the like. The arm 170 extends substantially normally from the head 160 for rotation with the bolt about its axis of rotation. A post 178 is borne rigidly on the proximal end portion of the arm 170 in a substantially vertically upright attitude. The post is of predetermined dimension and, as can best be seen in FIG. 4, and as described in greater detail hereafter, is spaced from the bolt a predetermined distance to permit alternative engagement by the post 178 of the heads 125 of the bolts 123 upon reciprocal rotation of the bolt 157. Accordingly, it will be seen that screw-threaded adjustment of the bolts 123 to move their respective heads 125 nearer to and farther from the front surface 82 of the frame 80 serves to delimit the range of arcuate motion of the bolt 157 and arm 170.

The distal end portion 175 of the arm 170 provides a hole 180 transversely therethrough.

An arm actuating assembly 183 is pivotally mounted on the distal end portion 75 of the arm 170. The arm actuating assembly provides a housing 185 having a bore 188 therethrough and providing a recessed seat portion 190 of predetermined dimensions. A pair of annular bushings 193 are closely received within the seat 190. A shoulder bolt 195 having a screw-threaded distal end portion 197 is received through the bore 188 and the bushings 193, with the screw-threaded distal end portion 197 screw-threadably extended through the hole 180 in the distal end portion 175 of the arm 170. A plurality of spacer rings 200 are received about the shoulder bolt 195 to space the housing 185 from the distal end portion 175 of the arm 170, as can best be seen in FIG. 6.

Figure 6:
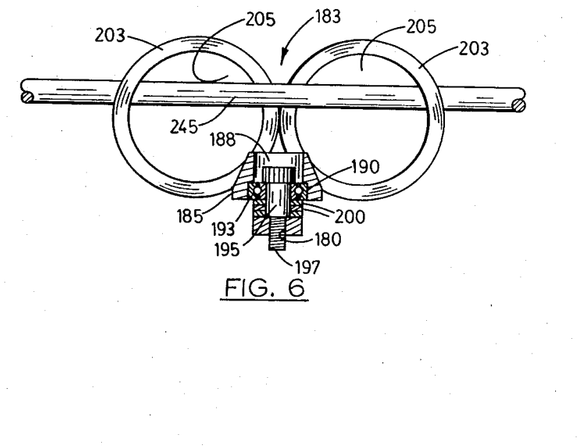
FIG. 6 is a somewhat enlarged sectional view taken on line 6—6 in FIG. 4.

A pair of annular rings 203 each providing a hole 205 of predetermined dimensions therethrough are borne by the housing 185 of the arm actuating assembly 183, as can best be seen in FIGS. 4 and 6. The rings individually are substantially planar and are secured on the housing, as by welding or the like, in substantially tangential relation to each other and are disposed in oblique planes. As can best be seen by reference to FIGS. 3, 4 and 6, and as described in greater detail below, the rings are dimensioned to receive a portion of the carrier assembly 18 therethrough and are disposed to permit reciprocal passage of such portion through the holes 205 with limitedly frictional engagement of the rings during such passage.

Figure 5:
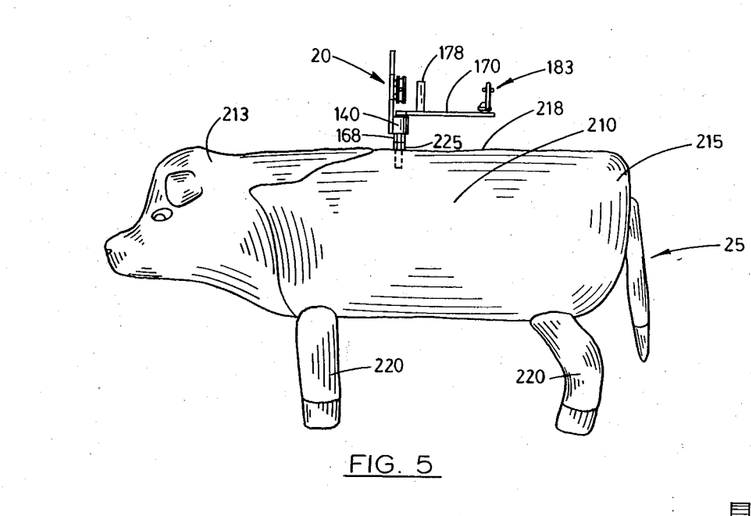
FIG. 5 is a side elevational view of a target portion of the device of FIG. 1 taken on line 5—5 in FIG. 2.

The target 25 is preferably, although not necessarily, substantially simulative of a cow. As can best be seen in FIGS. 1, 2 and 5, the target 25 provides a body 210 having a predetermined head portion 213 and an opposite, predetermined tail portion 215. The body 210 has a back 218 and four legs 220 depending from the body. As can best be seen in FIGS. 2 and 5, the target 25 is secured to the target mount member 20 and, in an operative attitude, depends therefrom. The body 210 is screw-threadably secured to the screw-threaded end 165 of the bolt 157, or by any suitable means, such as welding or the like. An internally screw-threaded sleeve, nut or the like (not shown) can be provided internally of the target for attachment of the target to the bolt. A lock nut 225 is screw-threadably received on the screw-threaded end portion 165 of the bolt 157 to secure the target for rotation of the target with the bolt 157. As can best be seen in FIG. 5, the target is secured to the bolt at a point between the head portion 213 and tail portion 215 along the back 218 of the body 210 in proximity to a point corresponding with the target's center of mass. Further, it will be seen upon reference to FIGS. 2 and 5 that the tail portion 215 is aligned subjacent the arm 170 while the head portion 213 extends oppositely remotely relative to the arm.

As can best be seen in FIG. 1, a pair of mounting hooks 230 are individually secured on the mounting plate 42 and mounting plate 70, respectively.

The carrier assembly 18 provides a track portion or cable 235 adapted to be deployed in substantially tangential relation extending between the motive portion 35 and the driven portion 37 when the device 10 is deployed in an operative attitude. The cable provides a first end portion 237 and an opposite, second end portion 239 secured to a turnbuckle 240. The first end portion 237 is adapted removably to be secured on the mounting hook 230 secured to the mounting plate 70. The turnbuckle 240 is adapted removably to be secured on the mounting hook 230 borne by the mounting plate 42. The turnbuckle is operable in a substantially conventional manner when operatively deployed to increase or decrease tension in the cable 235, as desired, upon adjustment of the turnbuckle. Preferably, the cable is constructed of wound or braided steel or other suitable material. Upon reference to FIGS. 7 and 8, it will be seen that the wheels 90 and 92 are spaced from each other a distance sufficient to permit passage of the cable 235 therebetween in an operative attitude with the cable closely received within the channels 93 and 95, respectively, of the wheels 90 and 92, whereby the target mount member 20 is adapted to ride back and forth along the cable 235 with the cable 235 captured within the channels of the wheels.

The carrier assembly 18 further provides a cord 245 of a predetermined length constructed of nylon or other suitable durable material and having a first end portion 247 and an opposite, second end portion 250. A detachable fastener 253 is secured on the first end portion 247 of the cord 245. A detachable fastener 255 is secured on the second end portion 250. A spring 257 having a first end portion 259 and an opposite, second end portion 260 is secured on its first end portion 259 to the fastener 255. The second end portion 260 mounts a detachable fastener 263. As can best be seen by reference to FIG. 1, the fastener 253 on the first end portion 247 of the cord 245 is adapted in an operative attitude to be attached on one of the ears 110 extending upwardly from the frame 80 of the target mount member 20. Similarly, the fastener 263 on the second end portion 260 of the spring 257 is adapted removably to be attached on the remaining ear 110. Upon reference to FIGS. 2, 3, 4 and 6, it will be seen that the cord 245 is adapted to be extended through the holes 205 of the rings 203 when the device 10 is employed in an operative attitude. As can best be seen by reference to FIGS. 1 and 2, in an operative attitude, the cord 245 is received about the driven pulley 78 of the driven portion 37 and a selected one of the secondary pulleys 68 of the secondary drive pulley assembly 60.

The driving assembly control means 30 provides a transmitter 270 having a single-button trigger or actuator 273. The transmitter is adapted to transmit a signal of a predetermined frequency upon actuation of the trigger 273. The transmitter provides a clip 275 for attachment thereof to a portion of the clothing of an operator of the device 10, as desired. It will be understood that the transmitter is illustrated in FIG. 1 in a somewhat enlarged manner relative to the remaining components of the device 10 for illustrative purposes.

Further, the transmitter 270 can be constructed in a substantially conventional and well known manner and can be embodied in any suitable form adapted for transmitting a signal of predetermined frequency capable of receipt by a receiver. The driving assembly control means 30 further provides a receiver portion 280, depicted substantially schematically in FIGS. 1 and 2, mounted within the housing 39 of the driving assembly 12. The receiver is adapted to receive signals transmitted from the transmitter 270 when the transmitter is remote therefrom. The receiver is connected to the drive means 48 through the circuitry thereof, as shown in FIG. 9, to actuate the operation thereof.

Figure 9:
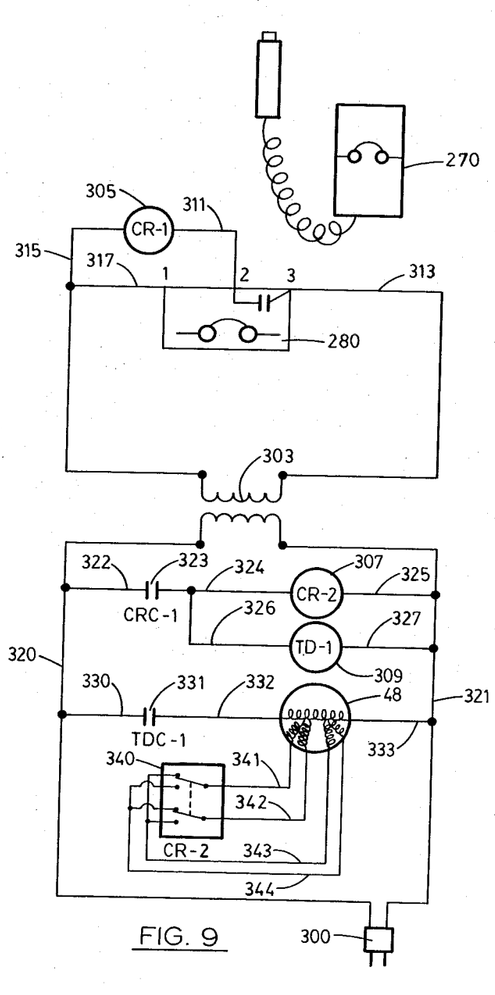
FIG. 9 is a schematic diagram of an electrical circuit adapted for use in the device of the present invention.

A schematic diagram of a circuit adapted for use in the device 10 of the present invention is shown in FIG. 9.

The circuit provides a plug 300 adapted for connection to a conventional 120 volt electrical source to energize the circuit. A transformer 303 is provided to step down the current powering the receiver unit 280 which, in the preferred embodiment, is a 24 volt receiver. A control relay 305, designated CR-1, is provided to cause the reversible motor 48 to commence operation in a predetermined rotational direction upon signalling thereof by the receiver 280. A reversing control relay 307, designated CR-2, is provided to cause a reversal in the rotational direction of the reversible motor 48. A time delay relay 309, designated TD-1, is provided to cause a lag time or delay of predetermined duration between initiation of a signal to the receiver unit 280 and effectuation of the signal at the reversible motor 48. In the preferred embodiment, such a delay is approximately one-half second, although it will be appreciated that a delay greater or less than such a delay could be utilized.

An electrical conductor 311 connects the receiver unit 280 with the control relay 305. Electrical conductor 313 connects receiver unit 280 with the transformer 303. Electrical conductor 315 connects the control relay 305 with the transformer. Electrical conductor 317 connects the receiver unit 280 with electrical conductor 315.

Electrical conductor 320 connects the plug 300 with the transformer 303. Electrical conductor 321 connects the transformer 303 with the plug 300. Electrical conductor 322 connects electrical conductor 320 with a control relay contact 323. Electrical conductor 324 connects control relay contacts 323 with reversing relay 307. Electrical conductor 325 connects reversing relay 307 with electrical conductor 321. Electrical conductor 326 connects electrical conductor 324 with time delay relay 309. Electrical conductor 327 connects time delay relay 309 with electrical conductor 321.

Electrical conductor 330 connects electrical conductor 320 with a time delay contact 331. Electrical conductor 332 connects time delay contact 331 with the reversible motor 48. Electrical conductor 333 connects the reversible motor 48 with electrical conductor 321.

A two-position reversing relay switch 340 is provided, and is connected to electrical conductor 332 by electrical conductors 341 and 342. Reversing relay switch 340 is connected to electrical conductor 333 by electrical conductors 343 and 344.

OPERATION

The operation of the device of the present invention is believed apparent and is briefly summarized at this point.

While the device of the present invention finds utility in eliciting responses from animals to various moving stimuli, it is particularly well adapted for use in training cutting horses to respond to the visual stimuli presented by the unpredictable movements of a cow singled from a herd. Accordingly, specific reference is made to suoh use of the device, although it is understood that the invention is not limited to such use or method of operation.

A suitable operative environment is first chosen for deployment of the device 10. Preferably, although not necessarily, the operative environment is one chosen to simulate that in which an actual cow or cows would normally be located, such as a corral or training arena having a fence or the like providing suitable uprights for deployment of the motive portion 35 and the driven portion 37 of the driving assembly 12. Alternatively, suitable upright support structures 45 can be installed spaced from each other a predetermined distance.

The mounting plate 42 of the motive portion 35 is secured on one of the upright structures 45 to dispose the housing 39 a predetermined distance above the earth or other surface 15 of the operative environment. Such distance is, preferably, one which is sufficient to permit movement of the target 25 back and forth upon the cable 235 of the carrier assembly 18 without impedement of the travel thereof by engagement of the earth surface 15 by portions of the target.

The driven portion 37 is similarly secured to an upright support structure 45 as by screws, bolts, or other suitable fastening means and is deployed in an elevated attitude relative to the earth surface 15 to dispose the hook 230 secured thereto a sufficient distance above the earth surface to permit substantially horizontal deployment of the cable 235 between the hooks 230 of the motive portion 35 and driven portion 37.

The cable 235 is then passed within the channels 93 of each pair of corresponding wheels 90 and 92 borne on the frame 80 of the target mount member 20. The cable 235 is then supported on the hooks 230 by attaching the turnbuckle 240 to either of the hooks 230, as desired, and securing the opposite end portion 237 on the other of the hooks 230. Preferably, the upright support structures 45 are disposed a sufficient distance from each other to permit tensioned, substantially horizontal deployment of the cable 235. Slack in the cable 235 is taken up by adjustment of the turnbuckle 240 to provide the cable 235 with resistance to substantial deflection from the horizontal upon the exertion of transverse force directed thereagainst, such as by the weight of the target 25. When so deployed with the target mount member 20 borne on the cable 235, the target mount member is adapted to travel back and forth between the opposite end portions of the cable along a substantially horizontal path.

The target member 25 can be installed prior to or subsequent to the installation of the target mount member 20 on the cable 235. The target 25 is installed on the screw-threaded end 65 of the bolt 157 by screw-threadable attachment of the bolt 157 on the back 218 of the body 210 of the target 25. The lock nut 225 is tightened to prevent slippage of the target about the longitudinal axis of the bolt 157. Optionally, the target member 25 can be secured to the bolt by other suitable means, such as by welding or the like.

The cord 245 is then installed on the driving assembly 12 by first passing the first end 247 thereof about the driven pulley 78 of the driven portion 37 and passing it through the holes 205 of each of the pair of rings 203 borne on the arm actuating assembly 183. The first end portion 237 is then looped about a selected one of the secondary pulleys 68 of the motive portion 35 and is then secured by fastening the clip 253 on the nearest ear 110 mounted on the frame 80 of the target mount member 20. The spring 257 borne on the second end 250 of the cord 245 is then secured on the remaining ear 110 by attaching the clip 260 thereto.

It will be seen that, due to the differing diameters of the secondary pulleys 68, selection of a larger pulley for installation of the cord 245 will effect a greater speed of movement of the cord and consequent movement of the target mount member 20 and target 25 upon actuation of the drive means 48 than will selection of a pulley of lesser relative size.

The plug 300 of the electrical cord 50 is then connected to a conventional 120 volt or other suitable electrical source to energize the circuit. The operator of the device then grasps the trigger 273 of the transmitter 270 in preparation for actuation of the device. The transmitter 270 can be attached to a portion of the operator's clothing by the clip 275 or can be disposed in any convenient accessible location, such as the saddle of a horse or a pocket of the operator's clothing.

In the training of horses for use in operations such as cutting or singling cows from a herd, it is preferable that the operator of the device be the rider of the horse to be trained. The device finds its greatest advantage when so operated in that the rider is in control of the movement of the target 25 at all times and, if necessary, can assist the horse in responding to the movement of the target by slightly anticipating changes in the movement and cessation of movement of the target and urging the horse to respond promptly to such movement. Further, the single-button control provided by the trigger 273 enables the rider to maintain control of the horse by grasping the reins with his free hand.

The device 10 is put into use by first bringing the horse into proximity with the target and causing the target to move by initially actuating the trigger 273 of the transmitter 270 to signal the receiver 280 to cause the energization of the drive means 48. Upon rotation of the axle 55 by the drive means 48, the axle 62 will be caused to rotate through force exerted by the drive pulley 57 upon the belt 65. Rotation of the secondary pulleys 68 causes a corresponding movement of the cord 245. Depending upon the direction of the rotation of the axle 62, the cord will be alternately caused to draw the target mount member 20 toward and away from the motive portion 35. Movement of the cord 245 continues as long as the trigger 273 is maintained in a depressed attitude by the operator.

Upon cessation of operation of the drive means 48 by release of the trigger 273, the cord 245 will cease movement. Reactivation of the trigger 273 causes the drive means 48 to reverse operation to move the cord in a direction opposite to that which it previously traveled. However, the cord can be caused to resume the initial direction of travel without reversal by first releasing the trigger and quickly, within a predetermined time period, reactuating the trigger. The time period will be, of course, dictated by the circuit chosen for the operation of the device. Selection of appropriate time-delay relays can provide a time period for overriding the reversal of less than or greater than one-half of a second, although shorter time periods are, in most circumstances, preferable in order to provide for more responsive control of the operation of the device without lengthy delays. The ability to control the movement of the cord and, hence, the target member in such fashion is beneficial in the training of a horse, inasmuch as the movements of the target, from the horse's viewpoint, are substantially completely unpredictable, and can be infinitely varied as to duration of movement and direction of movement.

Of great advantage to trainers of horses is the manner in which the operation of the device results in a movement of the target strongly simulative of that of a real cow or other animal. As the motive portion is actuated to cause movement of the cord, the cord exerts force on differing portions of the target mount member 20 whereby the head portion 213 of the target becomes oriented with the direction of travel of the target mount member. For instance, as the first end portion 247 of the cord 245 is drawn toward the motive portion 37, the portion of the cord extending through the rings 203 frictionally engages the rings and passes through them in a direction obliquely opposite to that in which the first end portion is moving. Such frictional engagement of the rings 203 exerts a force upon the arm actuating assembly 183 causing pivoting of the arm 170 about the longitudinal axis of the sleeve 140. Pivoting of the arm 170 causes consequent pivoting of the bolt 157, which in turn causes the target 25 to pivot about a substantially coextensive axis of rotation. As the arm 170 pivots, the arm actuating assembly 183 pivots in an opposite direction to maintain the rings 203 in a minimally frictional relationship to the cord to permit passage of the cord therethrough.

Thus, during operation of the device, when the direction of movement of the target mount member is caused to reverse by reversal of the operation of the drive means 48, the tail portion 215 of the target 25 will be generally oriented in the resulting reversed direction of travel at the time that such reversal is initiated. As the cord is moved further, the target will be caused to turn and orient itself in a continuous motion with the head moving substantially arcuately from the previous direction of moving toward an orientation with the current direction of movement. In part due to the amount of tension in the spring 257, and partially due to the degree of resistance provided by the rings 203 to the passage of the cord 245 through the holes 205 thereof, the target 25 can be made to appear to be backing-up or backing-away from the generally laterally disposed attitude it has attained during its movement in its initial direction.

The movement of the target becomes even more simulative of that of a real animal, such as a cow, when the target is caused to come to a complete stop with its head portion 213 facing substantially perpendicularly to the course of travel of the target mount member 25. Such movement and cessation of movement, together with the posturing of the simulated target 25, strongly resemble the movements of a cow confronted by the cutting horse and which temporarily squares-off or "boxes".

Variations in the movement and orientation of the target 25 can be accomplished in several ways. First, as previously discussed, the speed of movement of the target mount member 20 and, hence, the target 25 can be varied by looping the cord 245 over a selected one of the pulleys 68. Second, the range of pivotal movement of the bolt 157 and arm 170 can be increased or decreased as desired by adjustment of the bolts 123 to move the heads 125 thereof nearer to or farther from the front surface 82 of the frame 80, whereby the arm 170 is permitted to move a greater or lesser distance about the axis of rotation, as desired, before its movement is delimited by engagement of the upright post 178 with the heads 125 of the bolts 123. Third, the immediacy of the movement of the target mount member 20 upon initiation of movement of the cord 245 can be varied by the use of springs 257 having varying degrees of tension and resistance to stretching. It will be seen that the spring provides an added simulation of the movement of a natural animal, in that the movement of the target mount member 20 in the direction of the spring will initially be slower than the actual speed of the cord, with a resultant acceleration as the spring contracts.

Finally, the responsiveness of the arm actuating assembly 183 can be increased or decreased by mounting the rings 203 for pivotal movement relative to each other, whereby the amount of friction exerted on the cord 245 as it passes through the holes 205 can be made greater or less, as desired, with the consequent effect of altering the quickness with which the arm 170 pivots about the bolt 57 upon a change in the direction of movement of the cord.

Therefore, it is seen that the present invention provides a device which is simple and yet effective for use in the training of animals to respond to unpredictable movements of visual stimuli. More particularly, the device of the present invention provides for the movement of a target in a manner more closely simulative of that of a real animal than heretofore attainable.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. A device for providing a visual stimulus discernible by a horse surmounted by a rider comprising:
   a visually discernible target;
   carrier means elevated relative to a ground surface for supporting the target in an elevated attitude;
   motive means for imparting motion to the carrier means to move the target in a selected direction:
   a mounting member secured to the target to support the target in depending relation therefrom and for movement therewith, the mounting member being responsive to movement of the carrier means to cause the target to be oriented in a selected attitude relative to the direction of movement of the target; and
   control means for selectively causing the motive means to operate and to cease operating.

2. The device of claim 1 wherein the carrier means includes a portion defining a substantially linear path along which the target is adapted to be moved.

3. The device of claim 2 wherein the target has a predetermined head portion and an opposite tail portion; and the mounting member is adapted to orient the head portion in leading relation to the tail portion upon movement of the target in a selected direction.

4. A device for providing a visual stimulus discernible by a horse surmounted by a rider comprising:
   a target having a predetermined head portion and an opposite tail portion;
   a carrier assembly adapted to be deployed in an elevated attitude to support the target in an elevated attitude relative to a ground surface and providing a mount member secured to the target for pivotal movement of the target;
   a track portion bearing the mount member for movement therealong in supporting relation to the target in an elevated attitude relative to the ground surface;
   a cord member connected to the mount member for moving the mount member along the track portion upon movement of the cord member;
   orienting means for causing pivotal movement of the target to orient the head portion of the target in the direction of movement of the mount member, the orienting means being carried by the mount member and providing an actuating member disposed in engagement with the cord member for actuation of the orienting means upon movement of the cord member;
   a driving assembly adapted to support the carrier assembly in an elevated attitude and operable selectively to move the cord member to effect movement of the mount member in a selected direction, the driving assembly providing a motive portion having a first pulley assembly and a motor connected in driving relation to the first pulley assembly, and a driven portion adapted to be deployed remotely from the motive portion and having a second pulley assembly, the cord member being carried on the first and second pulley assemblies for movement of the cord member thereabout; and
   a control portion operable to signal the driving assembly alternately to operate and to cease operation.

5. The device of claim 4 wherein the mount member provides detent means for delimiting the range of pivotal movement of the target.

6. The device of claim 5 wherein the track portion is disposed in a substantially horizontal attitude.

7. The device of claim 6 wherein the control portion is adapted to be carried remotely from the driving assembly.

8. The device of claim 7 wherein the motor is operable selectively to move the cord member in a first direction to move the target a selected distance in the first direction, to cease such movement, and to move a selected distance in a second direction opposite to the first direction, the motor further being operable to cause the cord to resume movement in the first direction after cessation of movement without intervening movement in the second direction.

9. A device for providing a visual stimulus discernible by an animal comprising
   an elongated cable member having spaced opposite ends and adapted to be deployed in an elevated attitude relative to a ground surface;
   a target mount member adapted to be borne by the cable member for movement back and forth therealong;
   a cord member secured on the target mount member and moveable to cause movement of the target mount member along the cable member;
   a driving assembly having a driven portion and a motive portion adapted to be mounted in spaced relation from each other in an elevated attitude relative to the ground surface, the driving assembly being adapted to support the cord member for movement of the cord member by the motive portion upon operation of the motive portion;

a target pivotally secured in depending relation on the target mount member for movement therewith and having a predetermined head portion and an opposite tail portion;

an actuating assembly borne by the target mount member and operable to effect pivoting of the target about an axis of pivotal movement upon a reversal in the direction of movement of the target mount member to orient the head portion of the target substantially in the resultant direction of movement of the target mount member; and a control member adapted to be carried remote from the driving assembly and selectively operable to cause operation and cessation of operation of the motive portion.

10. The device of claim 9 wherein the motive portion of the driving assembly provides a reversible motor connected in driving relation to a first pulley assembly borne on the motive portion; the driven portion provides a second pulley assembly; and the oord member is mounted on the first and second pulley assembly for movement thereabout in a selected direction upon operation of the motor.

11. The device of claim 9 wherein the target mount member provides a plurality of wheel members adapted to ride on the cable member and an elongated arm mounted for pivotal movement about an axis substantially coaxial with the axis of pivotal movement of the target; and the actuating assembly is borne on the arm in spaced relation to the target mount member for movement of the actuating assembly about the axis.

12. The device of claim 11 wherein the arm is substantially rigidly secured to the portion of the target mount member to which the target is secured; and the arm provides adjustable means for limiting the range of pivotal movement of the target.

13. The device of claim 12 wherein the cord member is adapted to engage the actuating assembly upon reversal of the operation of the motor to move the arm through its range of pivotal movement.

14. The device of claim 13 wherein the motor is selectively operable to cause the cord member to move the target mount member a selected distance in a first direction and to move the target mount member a selected distance in a second direction opposite to the first direction subsequent to cessation of movement in the first direction, and is further selectively operable to cause the cord member to resume movement of the target mount member in the first direction without movement in the second direction after cessation of movement in the first direction.

* * * * *